(12) United States Patent
Krantz (10) Patent No.: US 7,094,268 B2
(45) Date of Patent: Aug. 22, 2006

(54) SYSTEM AND METHOD FOR REMOVING POLLUTANTS FROM A ROADWAY

(75) Inventor: Jeffrey Krantz, Honolulu, HI (US)

(73) Assignee: 3K Technologies, Inc., Honolulu, HI (US)

( * ) Notice: Subject to any disclaimer, the term of this patent is extended or adjusted under 35 U.S.C. 154(b) by 154 days.

(21) Appl. No.: 10/797,985

(22) Filed: Mar. 9, 2004

(65) Prior Publication Data

US 2005/0000197 A1 Jan. 6, 2005

Related U.S. Application Data (60) Provisional application No. 60/517,153, filed on Nov. 3, 2003, provisional application No. 60/454,863, filed on Mar. 12, 2003.

(51) Int. Cl.
*B60H 3/06* (2006.01)
*F24F 13/28* (2006.01)
*B62D 25/16* (2006.01)

(52) U.S. Cl. .............. 55/385.3; 55/385.2; 55/515; 96/147; 96/152; 96/418; 454/69; 454/83; 454/156; 123/198 E; 280/847; 280/848; 280/851

(58) Field of Classification Search .............. 55/385.3, 55/515, 385.2; 454/370, 69, 83, 156; 96/147, 96/152, 418; 123/198 E; 280/848, 851, 280/847
See application file for complete search history.

(56) References Cited

U.S. PATENT DOCUMENTS

| | | | |
|---|---|---|---|
| 1,662,738 A * | 3/1928 | Coogle | 239/57 |
| 1,864,969 A | 6/1932 | White | |
| 1,931,946 A | 10/1933 | Zerk | |
| 2,003,109 A | 5/1935 | Farr | |
| 2,071,280 A | 2/1937 | Eksergian | |
| 2,590,363 A | 5/1952 | Adair | |
| 2,945,723 A | 7/1960 | Estes | |
| 2,952,339 A | 9/1960 | Felts | |
| 3,738,088 A * | 6/1973 | Colosimo | 96/26 |
| 4,005,768 A | 2/1977 | Bubnash | |
| 4,207,971 A | 6/1980 | Ishikawa et al. | |
| 4,290,820 A | 9/1981 | Swisher, Jr. et al. | |
| 4,323,377 A | 4/1982 | Jolin | |
| 4,484,667 A | 11/1984 | Bottieri, Jr. | |

(Continued)

FOREIGN PATENT DOCUMENTS

DE 197 15 435 A1 10/1998

(Continued)

OTHER PUBLICATIONS http://www.lkeenwheels.com/kleenwheels_install.htm Easy to Follow Instructions. Jul. 9, 2004 in 2 pages.

(Continued)

*Primary Examiner*—Minh-Chau T. Pham
(74) *Attorney, Agent, or Firm*—Knobbe Martens Olson & Bear LLP (57) ABSTRACT

Systems and methods for removing hydrocarbons and other pollutants from roadway surfaces are provided. The systems can include a pollution trap attached to a vehicle, where the pollution trap comprises an absorbent pad, filter, or membrane. The pollution trap is affixed to the vehicle, for example, in the wheel well, on a mud flap, on the underside of a vehicle or another suitable place where the pollution trap can be exposed to a roadway pollutant. The methods described herein can include liberating roadway pollutants from a roadway and using a pollution trap to collect the liberated roadway pollutants.

38 Claims, 10 Drawing Sheets

U.S. PATENT DOCUMENTS

| | | | |
|---|---|---|---|
| 4,921,276 A * | 5/1990 | Morin | 280/848 |
| 5,039,414 A | 8/1991 | Mueller et al. | |
| 5,147,429 A * | 9/1992 | Bartholomew et al. | 55/356 |
| 5,257,822 A | 11/1993 | Metcalf | |
| 5,358,442 A * | 10/1994 | Ekinci | 454/158 |
| 5,437,793 A | 8/1995 | Alper | |
| 5,509,690 A * | 4/1996 | Whittington | 280/851 |
| 5,509,853 A * | 4/1996 | Wells | 454/370 |
| 5,549,178 A | 8/1996 | Yuhas | |
| 5,614,100 A | 3/1997 | Gallup | |
| 5,692,547 A | 12/1997 | Lehr | |
| 5,698,139 A | 12/1997 | Alper | |
| 5,711,402 A | 1/1998 | Sumpter, Sr. | |
| 5,837,146 A | 11/1998 | Alper | |
| 5,961,823 A | 10/1999 | Alper | |
| 5,967,200 A | 10/1999 | Hall | |
| 5,993,372 A | 11/1999 | Holland | |
| 6,170,586 B1 | 1/2001 | Stroman | |
| 6,180,010 B1 | 1/2001 | Alper | |
| 6,475,393 B1 | 11/2002 | Alper | |
| 6,524,457 B1 | 2/2003 | Scott | |
| 6,524,842 B1 | 2/2003 | Vainberg et al. | |
| 6,524,992 B1 | 2/2003 | Mussmann et al. | |
| 6,526,741 B1 | 3/2003 | Whitehead et al. | |
| 6,743,281 B1 * | 6/2004 | Miller | 96/416 |
| 2002/0014259 A1 * | 2/2002 | Hahnl | 134/26 |
| 2002/0139095 A1 * | 10/2002 | Wang et al. | 55/385.4 |

FOREIGN PATENT DOCUMENTS

| | | |
|---|---|---|
| EP | 0 707 989 A1 | 4/1996 |
| GB | 2 218 354 A | 11/1989 |
| JP | 1 099634 A | 4/1989 |
| JP | 4 297341 A | 10/1992 |

OTHER PUBLICATIONS http://www.kleenwheels.com/kleenwheels_faq.htm How Can I Find a Dealer or Reach Someone for Technical Information? Jul. 9, 2004 in 3 pages.

http://www.kleenwheels.com/ Kleen Wheels are dust shields which protect your wheels from brake dust. Jul. 9, 2004 in 1 page.

Green, "The Causal Factor of Bus Wheel Injuries and a Remedial Method for Prevention of These Accidents," *J. Natl. Acad. Of Forensic Engineers*, vol. XVIII, No. 1, Jun. 2001.

Squillance et al., "Preliminary assessment of the occurrence and possible sources of MTBE in groundwater in the United States, 1993-1994," *Environ. Sci. Technol.*, 30:1721-1730 (1996).

\* cited by examiner

SYSTEM AND METHOD FOR REMOVING POLLUTANTS FROM A ROADWAY

CROSS-REFERENCE TO RELATED APPLICATIONS

This application claims priority under 35 U.S.C. §119(e) to U.S. Provisional Application Nos. 60/454,863, filed on Mar. 12, 2003, and 60/517,153, filed on Nov. 3, 2003, which are entitled SYSTEM AND METHOD FOR REMOVING POLLUTANTS FROM A ROADWAY, and both of which are hereby expressly incorporated by reference in their entireties.

FIELD OF THE INVENTION

The present invention relates to devices that remove pollutants from roadway surfaces. More specifically, the embodiments described herein include pollutant traps, such as porous filters, pads, or membranes, that attach to the under carriage of moving vehicles and collect roadway pollutants that are liberated from the road surface. Methods of using these devices to remove pollutants from the environment are also provided.

BACKGROUND OF THE INVENTION

According to the Environmental Protection Agency (EPA), nonpoint source pollution (NPS) is now the leading cause of water quality problems in America. NPS is caused by rainfall or snowmelt moving over and through the ground. As the runoff moves, it picks up and carries away natural and human-made pollutants, finally depositing them into coastal waters, lakes, rivers, wetlands and even our underground sources of drinking water. (See, for example, "Oil in the Sea" in *Pollution Equipment News*, dated October 2002.) These pollutants are many and varied, but they include oil, grease and toxic chemicals from urban runoff and energy production. Atmospheric deposition and hydromodification are also prime sources of NPS.

The accumulation of hydrocarbons and toxic metals on roadway surfaces is largely attributable to tailpipe emissions, tire tread wear, leaking automotive fluids, brake pad deterioration, and dirty car-washing water. (See U.S. Pat. No. 5,993,372, the entirety of which is hereby expressly incorporated by reference.) As tailpipe exhaust is emitted, for example, the many "fine" particles in the exhaust are either inhaled or they are filtered back down back down on to the street, waiting for rain to wash them into a storm sewer or for rolling tires to throw them back into the air (also referred to as "re-entrainment.") Fine particles, carbon monoxide, nitrogen oxides, volatile organic compounds, toxic organic compounds (e.g., toluene), and other heavy metals are all found in tail pipe exhaust. Additionally, as tire tread wears, pollution accumulates on roadway surfaces in the form of zinc, cadmium, carbon black, and fine particles of rubber. Furthermore, leaking oil, antifreeze, brake and transmission fluids, battery acid, grease and degreasing agents, also accumulate on the roadway surfaces. These automotive liquids contain toxic organic compounds and metals, as well. Brake pad dust is also a major source of roadway pollution and significantly contributes to the accumulation of copper in our waterways. In the San Francisco Bay, for example, brake pad dust is reported to be the largest source of copper pollution. (See "How Do Vehicles Pollute the Bay? Let's Count the Ways" available at the Palo Alto (Calif.) Regional Water Quality Control Plant web site)

The accumulation of roadway pollution is having a drastic effect on human health. In a study financed largely by the *National Institute of Environmental Health Sciences*, researchers calculated that the number of deaths from lung cancer increases by eight percent for every ten micrograms of fine particulate matter per cubic meter. The risk of dying from lung cancer as well as heart disease in the most polluted cities has been compared to the risk associated with nonsmokers being exposed to second-hand (cigarette) smoke over a long period of time. (See Jeanie Davis, "Air Pollution Increases Lung Cancer Risk; Evidence Links Bad Air with Heart Disease, Too" *MSN* and *WebMD* Medical News, Mar. 5, 2002.") Since the number of automobiles is increasing three times faster than the rate of population growth in the world and approximately 40% of deaths around the world can be attributed to various environmental factors, especially organic and chemical pollutants, the need for a device and method to remove these toxins from roadway surfaces is manifest. (See *BioScience*, October 1998 issue.)

Several different devices have been made to trap pollutants that are emitted from automobiles (e.g., U.S. Pat. Nos. 6,170,586, 5,711,402, 5,993,372, 5,967,200, 5,549,178, 5,692,547, and 6,524,992, all of which are hereby expressly incorporated by reference in their entireties). Although these devices and approaches reduce pollution by trapping the pollutants before they contact the roadway surfaces, there remains a significant need for devices and methods that remove pollutants that have already accumulated on roadway surfaces.

SUMMARY OF CERTAIN INVENTIVE ASPECTS

The invention includes embodiments of systems and methods for removing pollutants from a roadway surface. In one embodiment, the system includes a vehicle that comprises a pollutant trap that is mounted on the underside of the vehicle such that an exposed surface of the pollutant trap collects pollutants that are distributed onto the trap when a vehicle is driven over the roadway (e.g., pollutants liberated from the roadway surface by the tires of the vehicle or by the suction created under the vehicle during driving or when suction is induced by a fan, blower, or vacuum). In some embodiments, the pollutant trap comprises a frame and pad. In one embodiment, the pollutant trap comprises an ionic cleaning system that adds charged ions to the air and traps pollutant particles with electrostatically-charged collection plates. In other embodiments, the pollutant trap comprises a pad or filter that is affixed to the vehicle. In yet other embodiments, the system includes a fan, blower or vacuum that induces or focuses air and pollutants to the pollutant trap.

The pollutant trap can be mounted on the interior of the wheel well of the vehicle at a position that collects the spray that is emitted from the tires of the vehicle as the vehicle travels over the roadway or at a position that allows for the pollutants that are sucked under the vehicle to contact the pollutant trap. In other embodiments, the pollutant trap is mounted on the mud flaps of the vehicle. The pollutant trap can be attached by several types of fasteners including, but not limited to, screws, glue, nails, clamps, hook and loop fasteners (e.g., VELCRO® brand hook and loop fasteners), and/or sleeves that hold the pollutant trap in place. In other embodiments, the wheel housing on the vehicle is modified or redesigned such that it is or incorporates the pollution trap. In another embodiment, the wheel housing is optimized to focus the pollutants, which are sucked under the vehicle or into the wheel housing, to the pollutant trap. In various embodiments, the pollutant trap can be an oleophilic pad, a hydrophobic pad, a hydrophobic and hydrophilic pad, a charged pad, an uncharged pad, a magnetic pad, or a pad that traps hydrocarbons or toxic metals, and combinations thereof. For example, the pollutant trap can comprise a positively charged plastic material that can attract negatively charged biological matter.

Other embodiments of the invention concern methods to remove pollutants from roadway surfaces. For example, in one embodiment, pollutants that are present on a roadway surface are dispersed under the vehicle (e.g., liberated by the tires, sucked under the vehicle by the vacuum created while driving, or by airflow created by a fan, blower, or vacuum) and are captured by a pollutant trap that is mounted on the undercarriage of a vehicle. Some embodiments include trapping the pollutants from the roadway surface in a pollution trap which is mounted inside the wheel well of a vehicle. Other embodiments include trapping the pollutants from the roadway surface in a pollutant trap mounted on the mud flaps of the vehicle. Another embodiment includes removing pollutants from a wet or dry roadway surface by liberating or disturbing the pollutants with a vehicle and collecting or trapping the pollutants in an exposed portion of a pollution trap mounted on the underside of the vehicle. Using the systems and methods of the invention described herein, roadway pollutants (e.g., hydrocarbons, volatile chemicals, and toxic metals) are removed from the environment.

DETAILED DESCRIPTION OF CERTAIN INVENTIVE EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Devices and methods for trapping pollutants that accumulate on roadway surfaces have been developed and are described herein with reference to the accompanying figures. In several embodiments, the device comprises a pollutant trap that is affixed to the undercarriage of a vehicle at a position that allows the trap to collect and/or bind roadway pollutants as they are liberated from the roadway surface (e.g., pollutants that are liberated by the tires of the vehicle while driving, pollutants sucked under the vehicle by the vacuum created while driving, or pollutants forced under the vehicle or focused on to a filter by the airflow created by a fan, blower, or vacuum). Forced induction or suction of air using, for example, blowers, motors, or fans, can be used to increase the air flow and the flow of roadway pollutants to the pollutant trap. For example, forced induction or suction of air can be used to increase the flow of roadway pollutants to the pollutant trap when the vehicle is not moving fast enough to create a sufficient air flow to the pollutant trap. Embodiments of the invention include a pollutant trap (e.g., a pad, filter or membrane) that is affixed to the wheel wells, splash guards, or mud flaps of a vehicle at a position that collects roadway spray (e.g., rainwater or roadway dust) generated by the wheels of the vehicle or at a position that allows for contact with roadway pollutants that are sucked under the vehicle by the vacuum created while driving or by forced air induction (e.g., fan, blower, or vacuum). The pollutant trap can be composed of many different materials and is, preferably, composed of a material that binds hydrocarbons, toxic metals, oils, tars, fuels, lubricants, organic chemicals, pesticides, bacteria, asbestos, salt from de-icing and the like.

A vehicle equipped with a pollutant trap (e.g., a hydrocarbon filter affixed to the roadway splash zone of the wheel wells) can be used to reduce the amount of hydrocarbons on a roadway surface by simply driving the vehicle over the roadway surface. As the tires liberate roadway pollutants, for example, by pulling a slurry of pollutants and water from a wetted roadway surface or creating an aerosol of pollutant-laden dust from a dry roadway surface, the pollutants are brought into contact with the pollutant trap and affixed thereto, thereby reducing the amount of pollutants on the roadway surface.

Additionally, as a vehicle drives over a roadway surface, a vacuum is created under the vehicle, in particular at positions on the wheel well. The vehicle induced vacuum can be so considerable that it is thought to be the cause of several accidents whereby bicyclists are drawn into the wheels of passing busses (See *J. Natl. Acad. of Forensic Engineers*, vol. XVIII, No. 1, June 2001). As velocity increases, the pressure near the wheels of the vehicle decreases creating the vacuum. One embodiment of this invention utilizes this vacuum such that roadway pollutants that are liberated from the road surface are sucked under the vehicle and are disposed onto pollutant traps that are positioned under the vehicle and/or in the wheel wells of the vehicle, thereby reducing the amount of pollutants on the roadway surface.

A vehicle equipped with a pollutant trap (e.g., a hydrocarbon filter affixed to the wheel wells) and a pollutant liberator (e.g., a fan, blower, a vacuum that is affixed to the vehicle in a manner that generates airflow, preferable a vacuum, so as to bring pollutants in contact with the filter pad) is provided. The combination of the pollutant trap and pollutant liberator can improve the amount of pollutant collected onto the pollutant trap, especially when the vehicle is maintained at low rates of speed.

Figure 1:
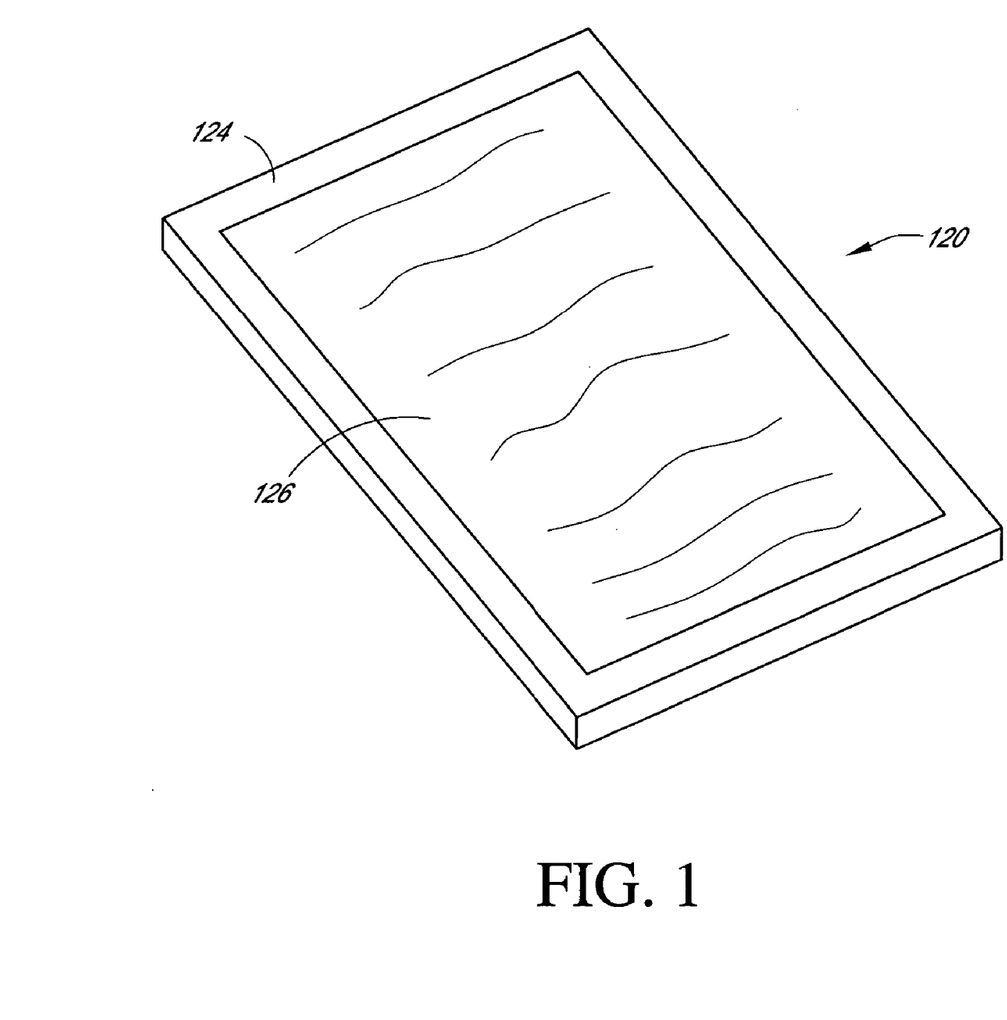
FIG. 1 is a perspective view of a pollutant trap in accordance with the preferred embodiments of the present invention.

FIG. 1 shows a pollutant trap 120 in accordance with a one embodiment. The pollutant trap 120 not only prevents damage to the vehicle but, more importantly, removes pollutants from the roadway surface, by collecting the environmental pollutants as they are disturbed from the roadway surface. In some embodiments, the pollutant trap 120 separates the environmental pollutants from water, or other non-polluting roadway fluids. In some embodiments, the pollutant trap 120 may also solidify the pollutants.

In the embodiment shown in FIG. 1, the pollutant trap 120 includes a housing 124 and a pollutant trap pad 126. The housing 124 can be any type of structure that holds the pollutant trap pad, for example, a frame that "holds" the pollutant trap pad 126 and exposes both sides of the pad 126 for collecting pollutants. In another example embodiment, the housing can be a structure that holds the pollutant trap pad 126 and exposes one side pad 126 for collecting pollutants. In certain embodiments, the pad 126 can be arranged such that at least one surface is exposed to the roadway, wheel, or wheel well. In another embodiment, the pollutant trap 120 comprises a pollutant trap pad 126, without a housing 124. When referring herein to a structure or a frame that "holds" the pollutant trap pad 126, numerous types of embodiments are contemplated including where the pollutant trap pad is attached, in any way (e.g., via clips, snaps, hook and loop fasteners, buttons, adhesive, screws, fasteners with interlocking male and female parts, mechanical pressure, etc.) to the structure, the attachment being either permanently or removably.

As will be described in detail hereinafter in FIG. 4, the pollutant trap 120 can be attached to any part of a vehicle that exposes the pollutant trap pad 126 to roadway pollutants, including the underside of a vehicle, or the wheel housing. The wheel housing (or wheel well) of a vehicle can be designed such that it improves the vacuum under the vehicle or into the wheel well and focuses the dispersed pollutants onto the pollutant trap pad 126.

Figure 2:
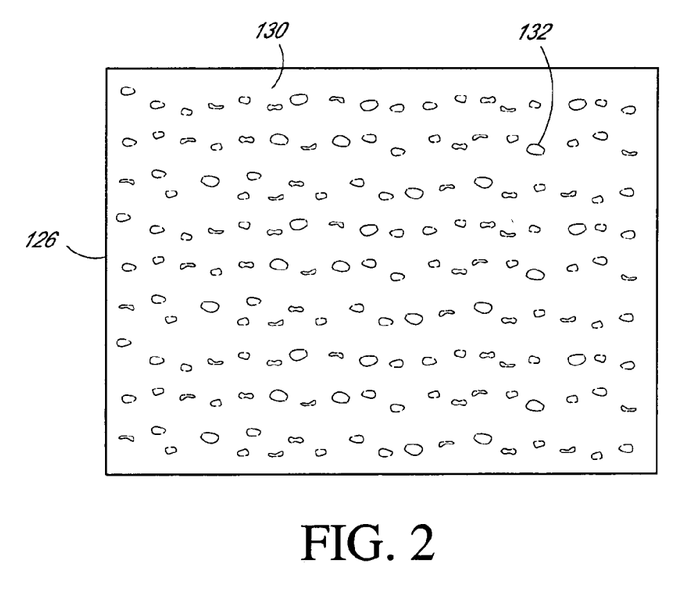
FIG. 2 is a front view of a pollutant trap.

As shown in a top or bottom broad surface view in FIG. 2, the pollutant trap pad 126 can comprise a pollutant trap material 130 which may comprise, for example, a membrane, sponge or a filter, that collects hydrocarbons and/or toxic metals. In some embodiments, the pollutant trap material 130 can bind, collect, catch and/or retain pollutants. In some embodiments, the pollutant trap pad 126 can comprise material that can repel water or other non-polluting roadway fluids. In one embodiment, the pollutant trap material 130 comprises a quilted absorbent pad for placement on the vehicle. In another embodiment, pollutant trap material 130 comprises a plurality of pores 132 that help the pollutant trap material 130 bind, collect, catch and/or retain pollutants.

In one embodiment, the pollutant trap material 130 comprises an absorbent sponge, which can be from an animal or synthetic source. Sponges that can be used in certain embodiments of the invention include the pollutant trap 120 described in U.S. Pat. No. 5,039,414, the entirety of which is herein incorporated by reference. In some embodiments, the pollutant trap pad 126 comprises organisms or chemicals that degrade and/or convert the pollutant into a non-polluting material (e.g., oil degrading bacteria, spore or bactericidal compounds).

Figure 3:
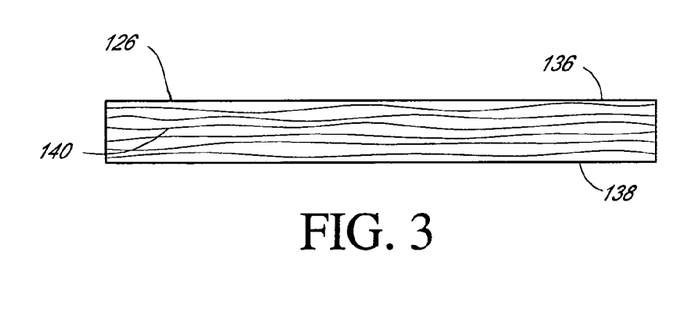
FIG. 3 is a side view of a pollutant trap.

FIG. 3 shows an edge view of a pollutant trap 126. The pollutant trap pad 126 has a top portion 136 and a bottom portion 138. The pollutant trap pad 126 can also include a plurality of layers 140. In some embodiments, all of the layers can have the same properties. In other embodiments, each of the layers 140 of the pollutant trap pad 126 can have different properties. For example, it may be desirable for the layers 140 at of near the top portion 136 to have hydrophobic properties (water-repellant), and/or layers 140 at or near the bottom portion 138 to have oleophilic properties (oil-attracting). In some embodiments, the pollutant trap pad 126 may include a coating, for example, a coating comprising a chemical or an organism, which provides the pollutant trap pad 126 with additional desirable properties.

In some embodiments, the pollutant trap pad 126 may be oleophilic, hydrophobic, or both oleophilic and hydrophobic. The pollutant trap pad 126 can comprise of materials that use absorption, adsorption, encapsulation, microencapsulation, volatilization, sedimentation, re-suspension, desorption, oxidation/reduction, complexation/chelation, precipitation, or biological uptake, or combinations thereof to remove the pollutants from the roadway.

In some embodiments the pollution trap pad 126 comprises sorbent material (referred to herein as "sorbents") that may be absorbent, adsorbent, or both. Absorbent materials are those that pick up and retain liquid distributed throughout its molecular structure. Adsorbent materials are insoluble materials that are coated by a liquid on its surface, including pores and capillaries. Sorbents can be natural organic, natural inorganic, or synthetic. Natural organic sorbents may include peat moss, straw, hay sawdust, ground corncobs, feathers, paper and other carbon-based materials. One example of a natural product that may be used is treated peat, available under the trade name "OCLANSORB", manufactured by Hi Point Industries, Newfoundland, Canada. Natural inorganic sorbents may include clay, perlite, vermiculite, glass wool, sand, volcanic ash, and the like. Synthetic sorbents may include plastics, such as polyurethane, polyethylene, and polypropylene, cross-linked polymers, rubber materials, gels, colloids, and the like. Preferably, combinations of absorbent materials are employed, which can be intermixed or provided in separate layers.

Many different types of absorbent material are known in the art, any of which can be incorporated into an embodiment of the pollutant trap 120 described herein. For example, some embodiments of the pollutant trap 120 include materials designed to collect salts that accumulate on roadways as a result of salting the roadways during the winter months. A suitable absorbent material for a pollutant trap pad 126 that collects roadway salt is described in U.S. Pat. No. 6,526,741, herein expressly incorporated by reference in its entirety. Alkali metals such as sodium and potassium salts can be readily absorbed to the absorbent material found in the Aqua Sep™ filter available from the Pall Process Filtration Company, Hydrocarbon, Chemical, Polymer Group. Use of this absorbent material in the pollution trap 120 described herein is contemplated. Similarly, the use of a magnetized absorbent material is known in the art and this technology can also be readily employed in the embodiments describe herein. (See e.g., U.S. Pat. No. 6,524,457, herein expressly incorporated by reference in its entirety).

Embodiments of the pollutant trap 120 can include many additional types of suitable membranes or filters that can be used alone or in combination with other membranes and filters described herein. For example, in various embodiments, the pollutant trap 120 can include one or more of the filtering materials produced by ESFIL TECHNO (a company located in company is located in North-East Estonia, within the territory of a free economic zone in an industrial part of Sillamae city), and the choice of filtering material can depend on the roadway pollutant(s) targeted for removal. In some example embodiments, the pollutant trap 120 can include a filtering polymer material ("FPM"), which is available from ESFIL TECHNO, and which is chemically stable to diluted acids, alkalis, alcohols, saturated hydrocarbon, glycerin, oils, petroleum and fresh water, and have a temperature range of maintenance from −30° C. up to +70° C. In other embodiments, the pollutant trap 120 can include a perchlorovinyl filtering material ("FPP"), which is available from ESFIL TECHNO, and which is chemically stable to strong acids and alkalis, alcohols, and saturated hydrocarbon, and has a working temperature range from −200° to 60° C. Examples of filtering materials that can be used in the pollutant trap 120 from ESFIL TECHNO includes, but is not limited to, FPP-D (generally used for thin air and gas filtering), FPP-D-4 (generally used for thin purification of liquids, fuels, oils including aviation oil, particles, air and gasses), FPP-G (generally used for purification of alcohols, acids and alkalis), POROFIL-G-5/206 (generally used for deleting of particles of more than five microns, and POROFIL-G-1/207 (intended for purification of perfumery liquids, alcohols, saturated hydrocarbons, oils, acids, technical and de-ionized water and aqueous solutions from mechanical impurities), FPAR-15-1.5 (generally used for filtering thin gases and air), and FPSF-15-1.5 (generally used for thin clearing of air from aero disperse mixtures, including microorganisms, bacteria and viruses).

Although the pollutant trap 120 can comprise various materials that can be used as filters in other applications, or referred to herein as "filters" or "filter material," the use of these such materials does not necessarily require an air-flow passing through the material when it is used in a pollutant trap, although in some cases the air-flow can pass through the material. Rather, an air-flow carrying roadway pollutants need only place the pollutants in proximity to the filter material so that the roadway pollutants are collected on, in or are bound to the filter material. In some embodiments, the pollutant trap 120 may comprise materials that have a high tolerance for heat, e.g., materials that have pollutant collection properties that are not affected by high temperatures, and/or materials that have a high combustion point, allowing the pollutant trap 120 to be disposed in locations on a vehicle subject to high temperatures, e.g., in proximity to the engine or the exhaust system.

Another common roadway pollutant that causes significant environmental damage are ether-based contaminants such as tertiary butyl ethers of the type utilized as gasoline oxygenates, for example, methyl tert-butyl ether (MTBE), ethyl tert-butyl ether, and methyl tert-amyl ether, and also ether solvents, for example, tetrahydrofuran. The full extent of MTBE contamination in US groundwaters has only recently been understood. A study performed as part of the US Geological Survey's National Water-Quality Assessment Program revealed that MTBE is the second most commonly detected contaminant in urban groundwaters (Squillace P. J., J. S. Zogorski, W. G. Wilber, and C. V. Price. "Preliminary assessment of the occurrence and possible sources of MTBE in groundwater in the United States, 1993–1994". Environ. Sci. Technol. 30:1721–1730 (1996)). Several different absorbent materials are known to trap the ether-based contaminants, in particular, MTBE, as well as, oils and greases. (See e.g., U.S. Pat. Nos. 5,437,793, 5,698,139, 5,837,146, 5,961,823, 6,524,842, 6,180,010, 6,475,393, and 5,614,100, all of which are hereby expressly incorporated by reference in their entireties).

With many of the embodiments, a suitable absorbent material, such as the absorbent material described in U.S. Pat. No. 6,475,393, or a similar material, may be preferred for the pollutant absorbent pad 126 because it efficiently collects oils, greases and the like, but also traps pernicious slightly soluble organic compounds such as benzene, toluene, xylene, halogenated hydrocarbons, ethoxylated glycols, etc. These noxious contaminants are among the more difficult compounds to remove from water and are carcinogenic. This absorbent material can also remove metal ions such as cadmium, chromium, copper, lead, nickel, zinc, arsenic, silver, and mercury. Example 1 below describes one way to manufacture this absorbent material.

EXAMPLE 1

In order to prepare a filter substrate for use with the invention, an infusion solution is prepared from a suitable solvent and the absorbent composition. In this example a solution is prepared from 90 w/w 99.9% acetone and 10 w/w absorbent composition, which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example is a nonwoven polypropylene, viz. the VERASPUN material of Yarorough & Co., Inc. of High Point N.C. This material has a weight of 1 oz./square ft. The substrate material is immersed in the infusion solution until saturated, then removed and excess liquid allowed to drip off. The material is then placed in a convection oven at 110 to 120° F. until acetone free. The material is then cured at room temperature for one week. The resulting material is then shredded and subsequently formed in various filter configurations (e.g., to fit in the wheel well of a vehicle).

Figure 4:
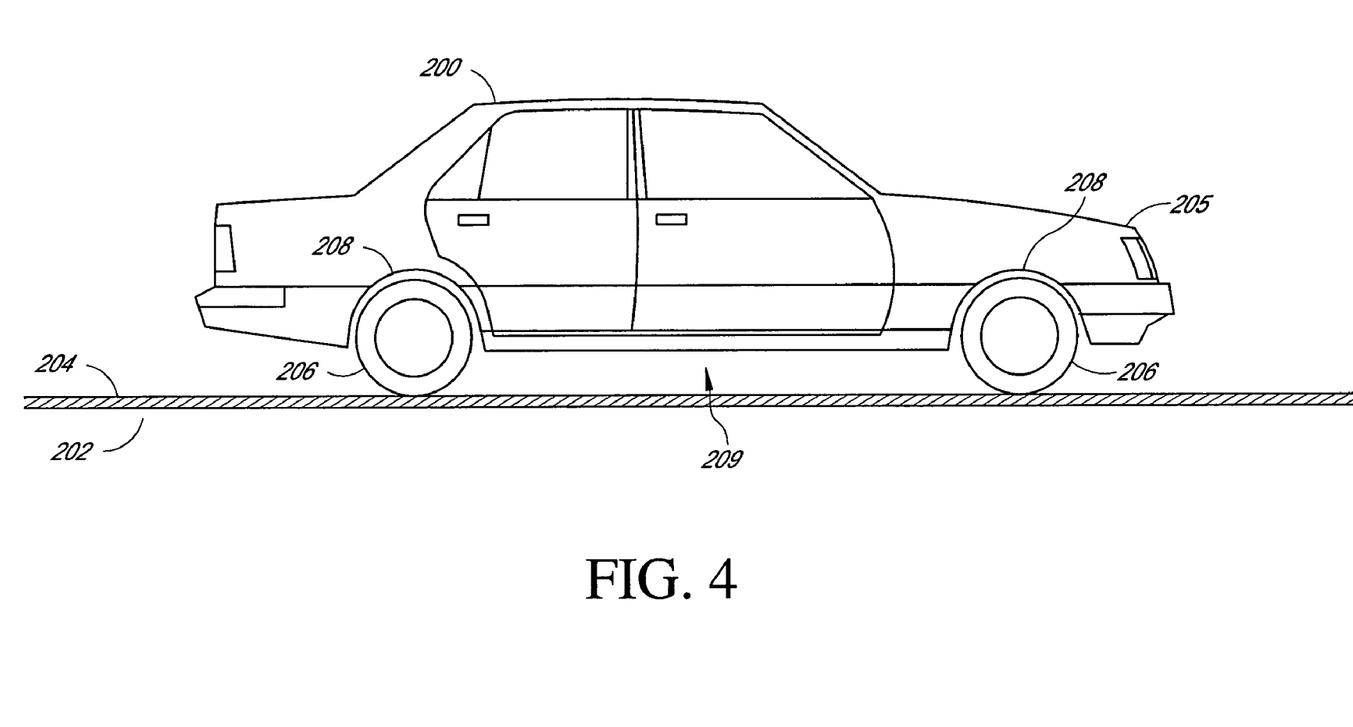
FIG. 4 is schematic view of a vehicle on a roadway.

With reference to FIG. 4, a vehicle 200 is shown on a roadway 202. The roadway 202 is shown with a layer of pollutants 204 disposed on the roadway 202, as is generally known to occur. The vehicle 200 includes a vehicle body 205 and wheels 206, which are shown to be at least partially surrounded by a wheel well 208. The vehicle body 205 includes an underside 209 which is exposed to the roadway 202. As the vehicle 200 moves along the roadway, the pollutants 204 are disturbed by the rotating wheels 206. The pollutants 204 are carried off the roadway 202 due to their contact with the wheels 206 and/or due to the vacuum created under and around the moving vehicle 200. The rotation of the wheels 206 can result in a spray of pollutants that can damage the vehicle and the environment. This situation is exacerbated when it rains. The rain causes the pollutants to rise to the surface of the roadway, creating unsafe driving conditions and increased damage to the environment. Since the wheels 206 are in direct contact with the roadway 202, the pollutant concentration is greatest near the wheels 206 and, in particular, at the wheel well 208 of the vehicle.

The spray of pollutants results from a wind-tunnel effect created by the rotation of the wheels 206. Studies have confirmed that the rotating wheels of a vehicle create low pressure at the wheel, causing objects to be drawn toward the wheel. See, for example, "The Causal Factor of Bus Wheel Injuries and a Remedial Method for Prevention of These Accidents" by James M. Green in *Journal of the National Academy of Forensic Engineers,* Vol. XVIII, No. 1, dated June 2001.

Figure 5:
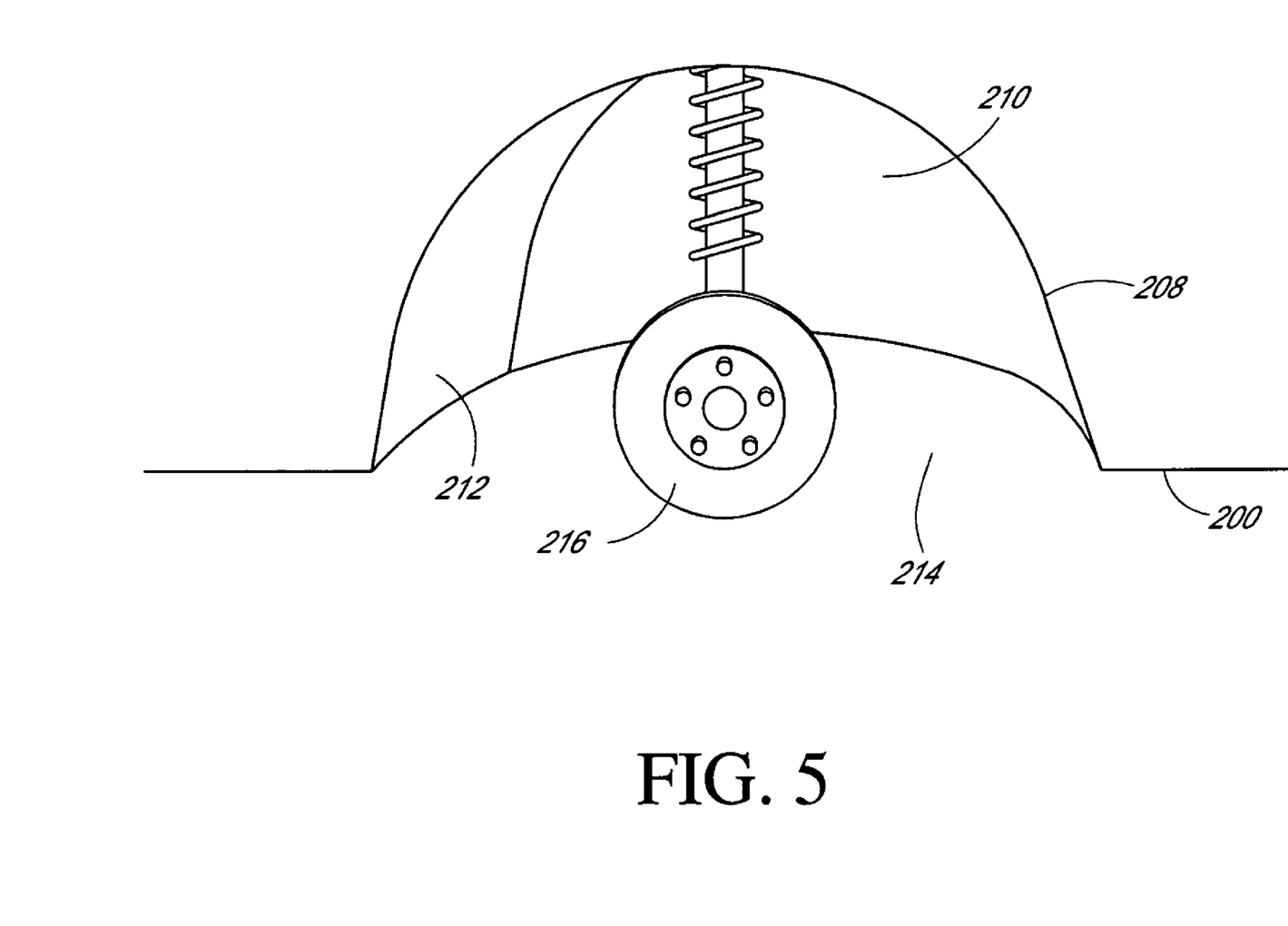
FIG. 5 is a detailed perspective view of the wheel well of a vehicle.

Referring to FIG. 5, a detailed view of the vehicle wheel well 208 is shown where the wheel well 208 does not include a pollutant trap. The wheel well 208 includes an inner surface 210, a transition surface 212, and an opening 214. The transition surface 212 connects the inner surface 210 to the body 205 of the vehicle 200, such that a partially open housing is formed. The wheel well 208 partially houses the wheel 206 and wheel assembly 216.

Figure 6:
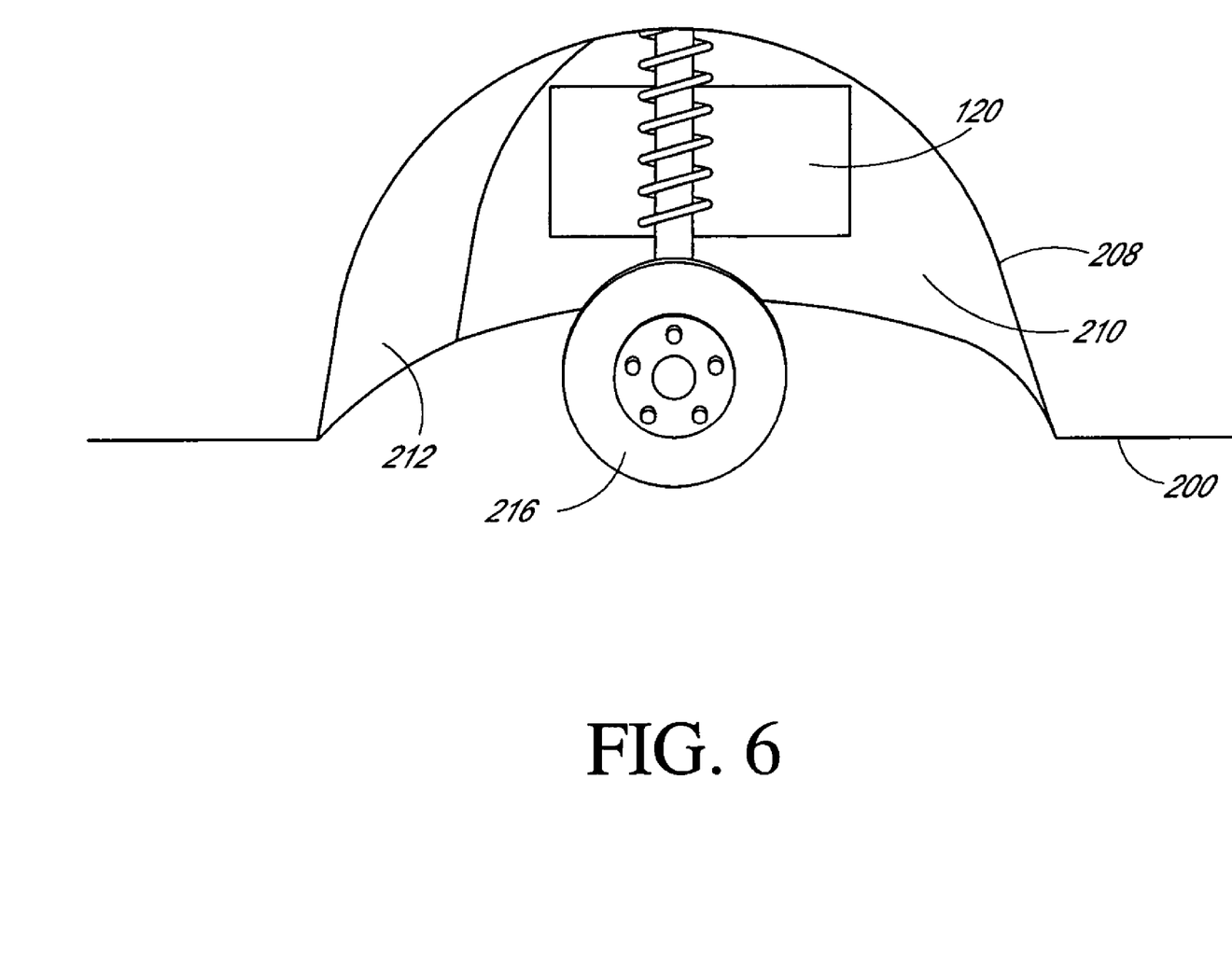
FIG. 6 is a schematic view of the pollutant trap of FIG. 3 used on the wheel well of a vehicle.
Figure 7:
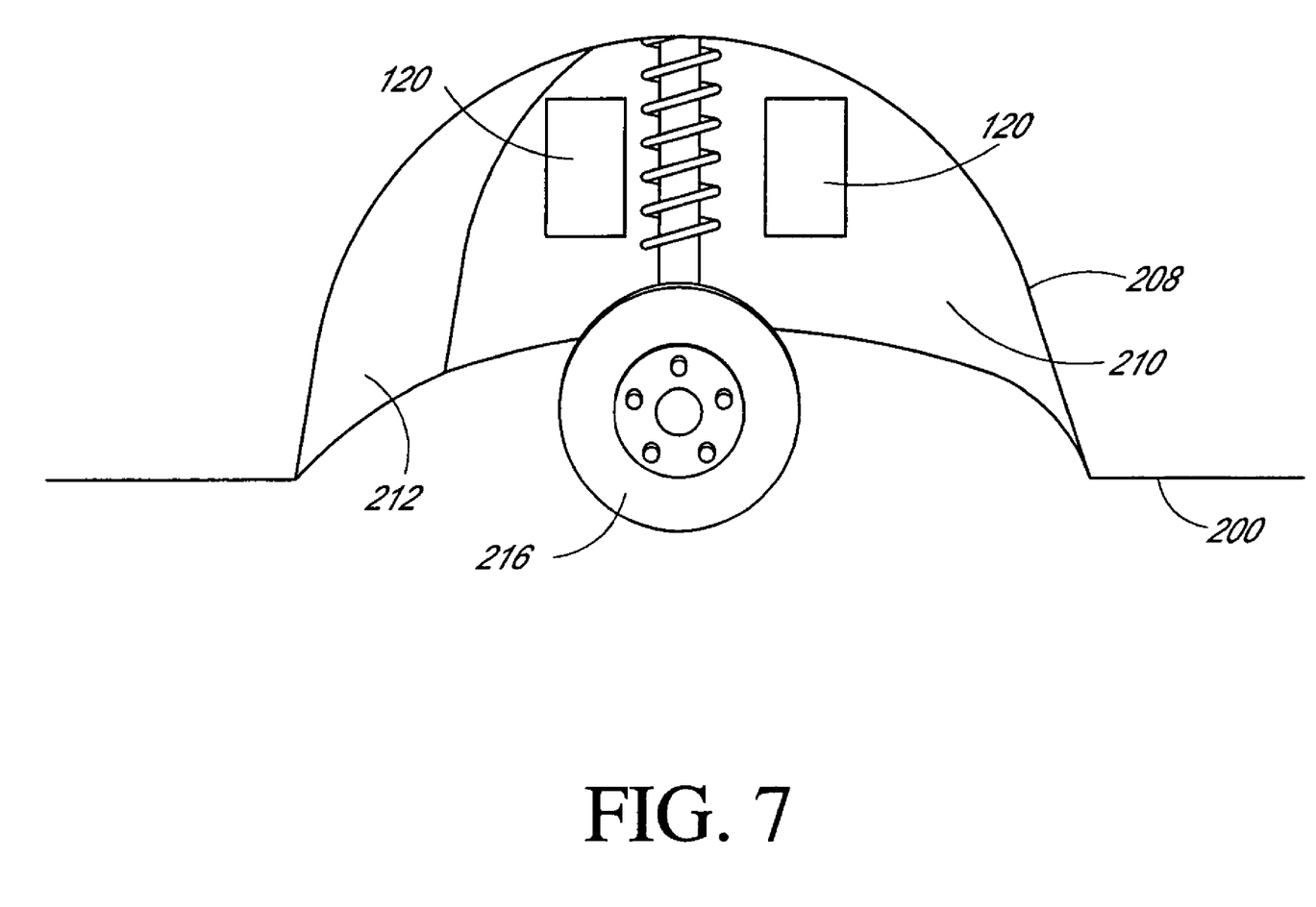
FIG. 7 is a schematic view of the pollutant trap of FIG. 3 used on the wheel well of a vehicle.
Figure 8:
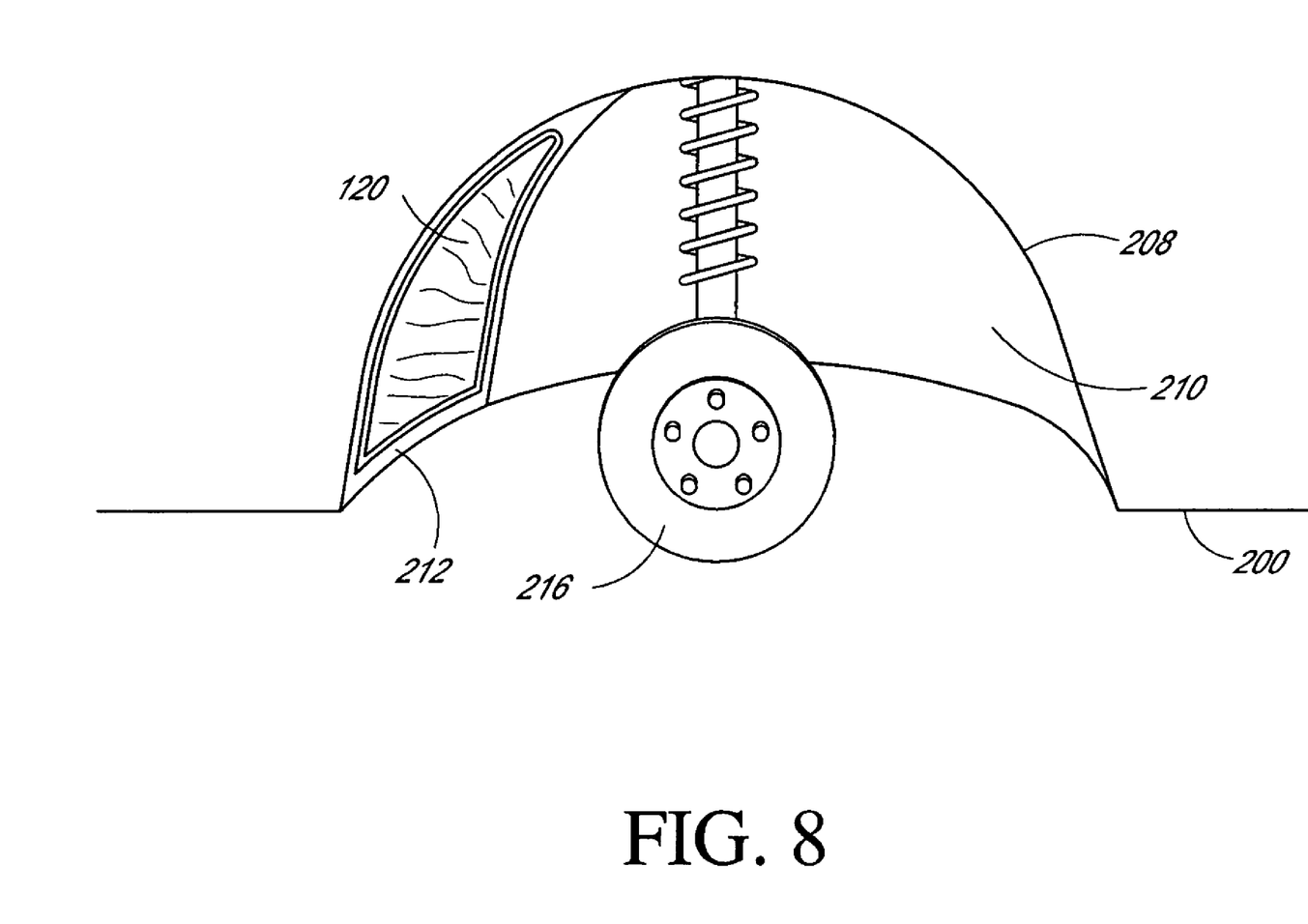
FIG. 8 is a schematic view of the pollutant trap of FIG. 3 used on the wheel well of a vehicle.

With reference to FIGS. 6–8, the pollutant trap(s) 120 is shown attached to the wheel well 208 of a vehicle 200. FIG. 6 shows a pollutant trap 120 attached to the inner surface 210 of the wheel well 208. FIG. 7 shows multiple pollutant traps 120 attached to the inner surface 210 of the wheel well 208. FIG. 8 shows a pollutant trap 120 attached to the transition surface 212 of the wheel well 208. As described hereinabove, since the greatest concentration of roadway pollutants is at the wheel well of a vehicle, it may be desirable to attach the pollutant trap 120 to the wheel well 208. Accordingly, in some embodiments, the wheel well is configured to essentially be the pollutant trap.

The pollutant trap 120 can be made to any suitable configuration, for example, triangular, elliptical, L-shape, square, rectangular, circular, round, spherical, or any other shape that is designed to fit onto any part of a motorized or non-motorized vehicle. The dimensions of the pollutant trap 120 can vary depending on the particular arrangement and location of the pollutant trap 120, as will be described hereinafter. Preferably, the pollutant trap 120 is constructed such that it snuggly fits into the wheel well, fender or on a mud flap of a vehicle 200 and has a shape that is commensurate to the wheel well splash pattern of a particular vehicle 100 and/or has a shape and/or position under the vehicle that is optimal for the collection of pollutants driven into and underneath the vehicle 100 by the vacuum created while driving and/or by to the airflow or vacuum created by a pollutant liberator such as a fan, blower, or vacuum apparatus.

The pollutant trap 120 may also include a fastener for attaching the pollutant trap 120 to the vehicle 100. Any method of attachment may be used to attach the pollutant trap 120 to the vehicle 100, such as Velcro, clips, screws, adhesives, fasteners, brackets, and the like.

In one embodiment the pollutant trap 120 is attached to the underside 209 of a vehicle 200. By providing the pollutant trap 120 on the underside of a vehicle 209, the pollutant trap 120 collects the pollutants that are disturbed or liberated when the vehicle 200 is driven on the roadway 202. In another embodiment, still more embodiments, the wheel housing 124 of a vehicle 100 is designed such that it improves the vacuum under the vehicle 100 or into the wheel well and/or focuses the dispersed pollutants onto the pollutant traps pad 126.

Figure 9:
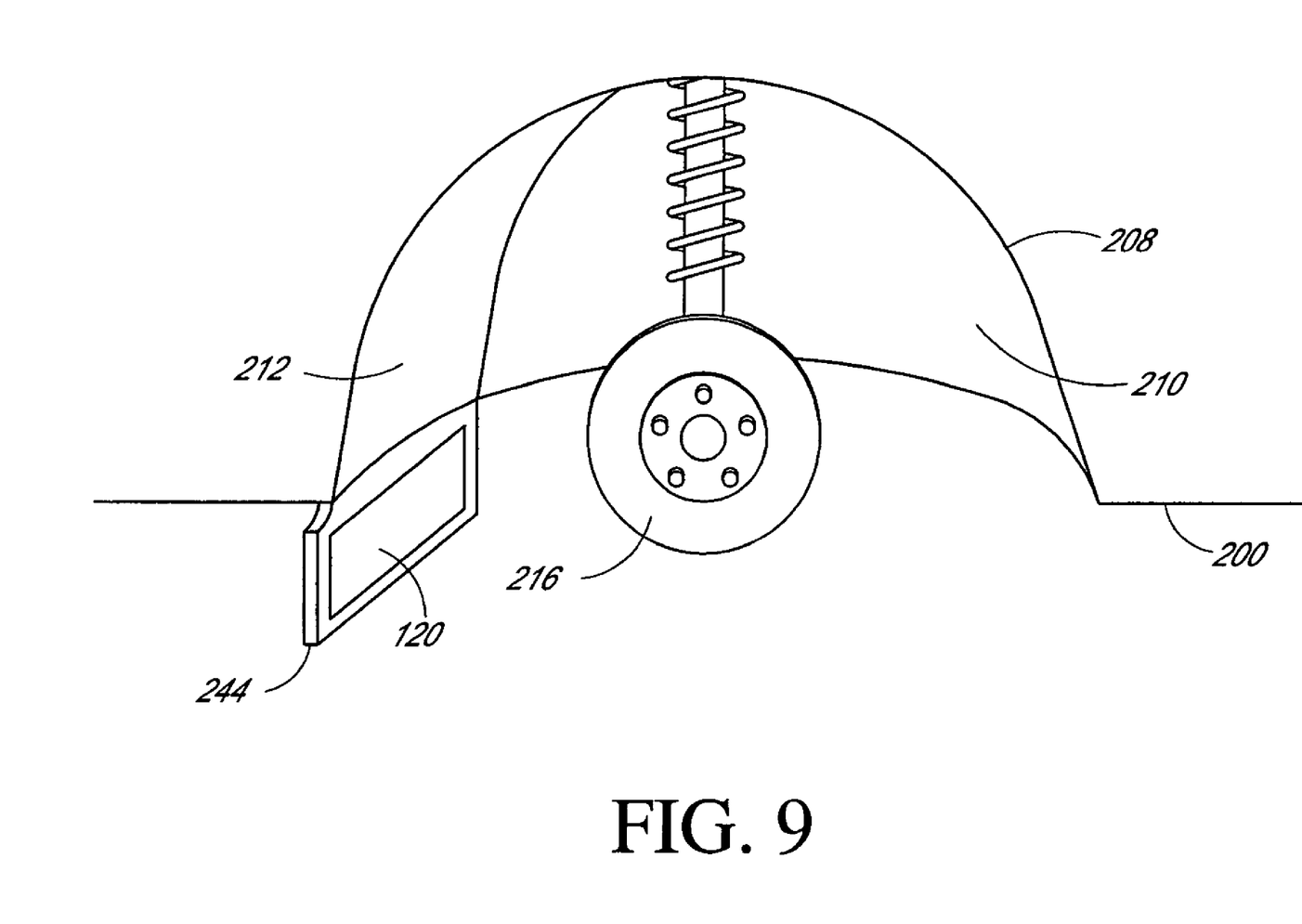
FIG. 9 is a schematic view of the pollutant trap of FIG. 3 used on the mud flap of a vehicle.
Figure 10:
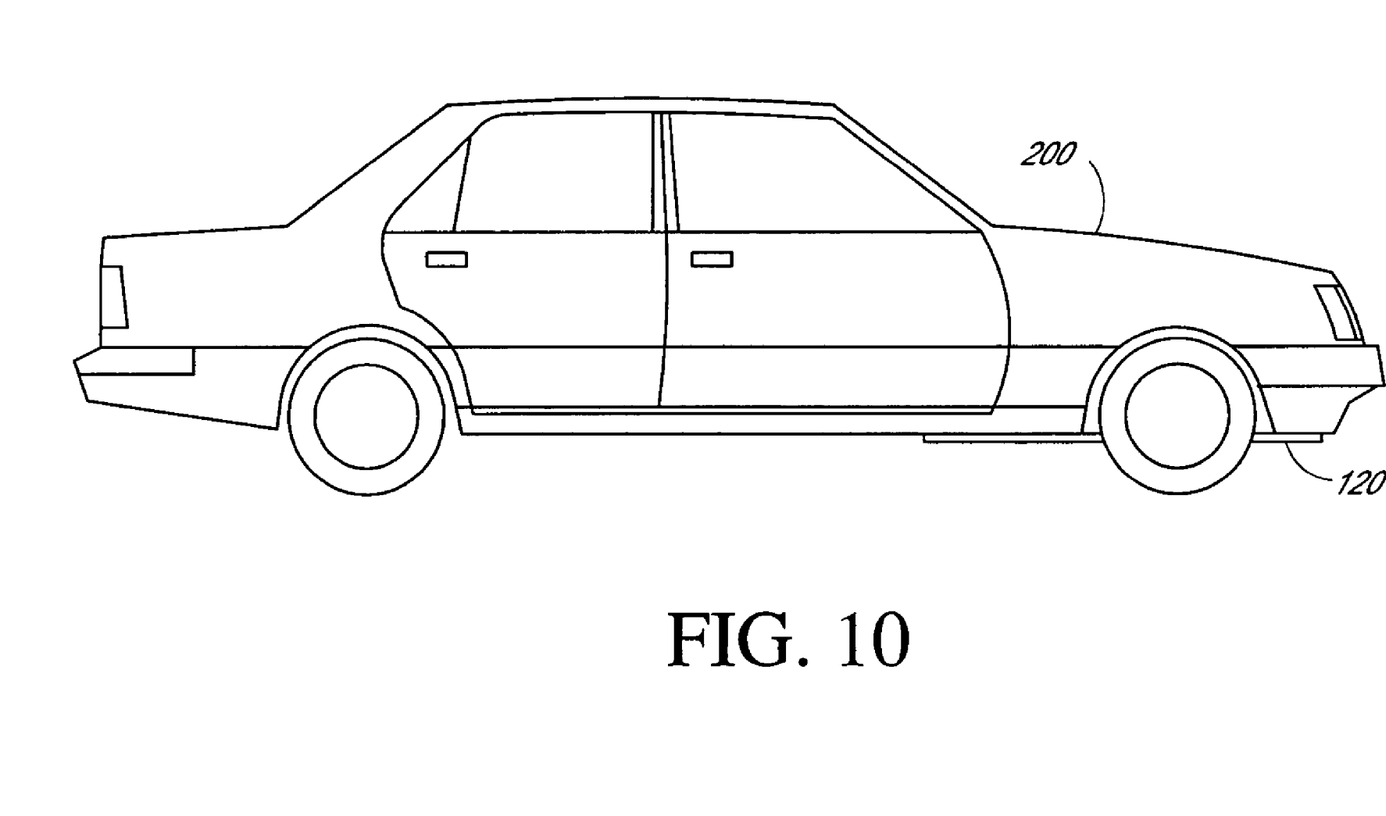
FIG. 10 is a schematic view of the pollutant trap of FIG. 3 used with a vehicle.

As shown FIG. 9, the pollutant trap 120 may also be provided on a mud flap 244 of a vehicle 200. Generally, however, as shown in FIG. 10, the pollutant trap 120 may be provided anywhere on the underside 209 of the vehicle 200, such that the exposed portion of the pollutant trap 120 is facing toward the roadway 202 at a position that collects roadway pollutants as they are liberated from the roadway surface. In some embodiments, the pollutant trap 120 may be provided at the front of the vehicle. In more embodiments, the pollutant trap 120 may be provided at the fender wheel well.

In some embodiments, a pollutant stimulator or liberator (not shown) may be used to increase the air flow near the pollutant trap and/or roadway, thereby increasing the pollutants removed from the roadway and attached to the pollutant trap. In some embodiments, the pollutant stimulator may use forced induction or suction to increase the air flow. Examples of pollutant stimulator include, but are not limited to, blowers, motors, fans and the like.

Figure 11:
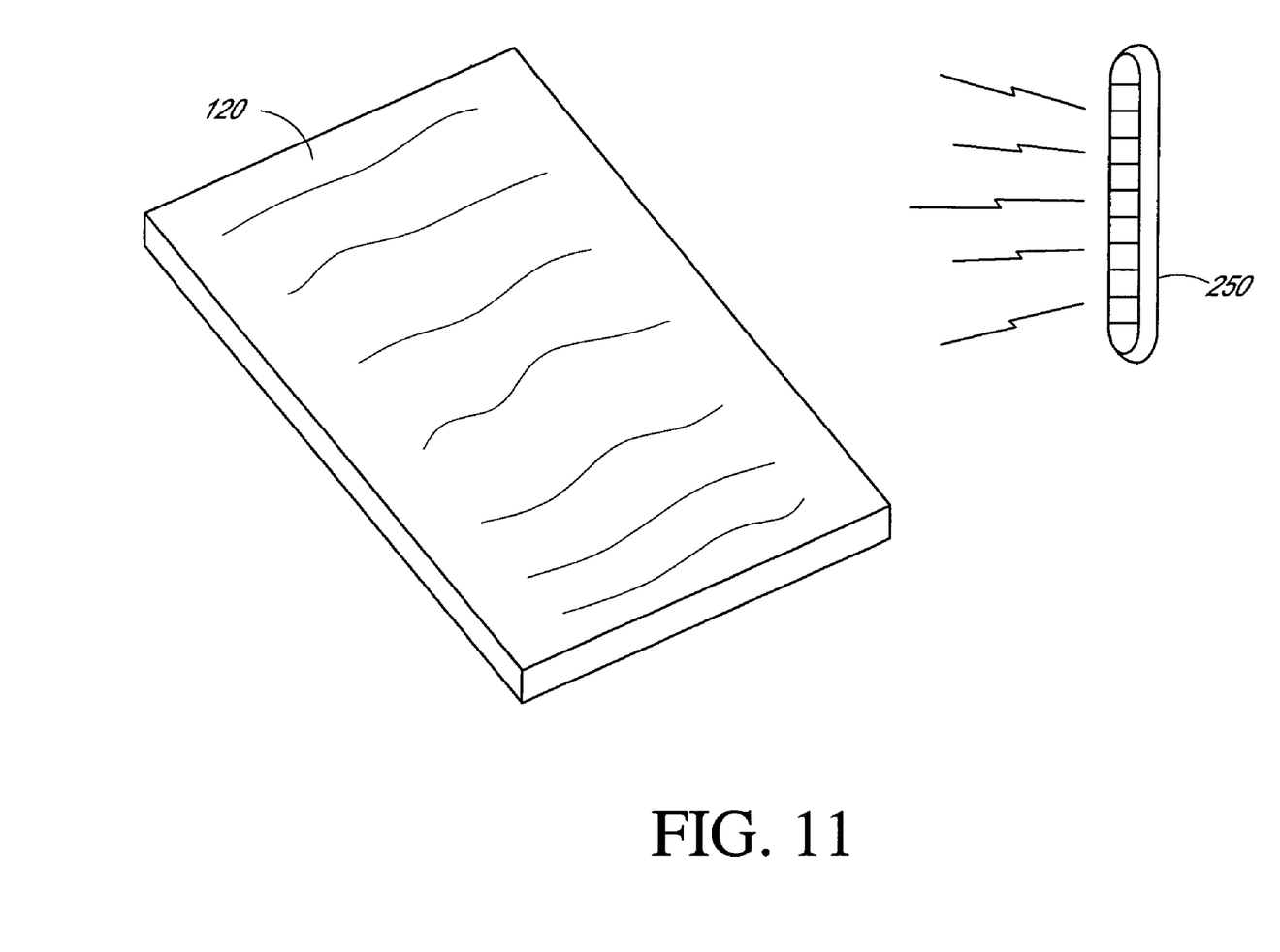
FIG. 11 is a schematic view of the pollutant trap of FIG. 3 exposed to a UV-light source.

In some embodiments, the pollutant trap 120 can be configured to kill bacteria, viruses, and/or other microorganisms. For example, in one embodiment (not shown) the pollutant trap 120 can include a material that is coated with a liquid which forms a series of microscopic spikes as it dries. The cell membrane of micro-organisms coming into contact with this surface is pierced, resulting in the death of the micro-organism. An example of an anti-microbic liquid which forms said microscopic spikes is Biogreen 3000™, which is available from Microgenix Technologies Limited of Kent, England. FIG. 11 illustrates another embodiment of a pollutant trap 120 that may be used to neutralize microorganisms. As shown in FIG. 11, the pollutant trap 120 can be exposed to an ultra-violet light source 250 to kill and/or neutralize bacteria, viruses, and other organisms present in the pollutant trap 120. In another embodiment, the pollutant trap 120 includes a disinfectant or an anti-biotic substance or material, for example, an antibiotic substance which is coated on the pollutant trap pad 126. In yet another embodiment, the pollutant trap includes a disinfectant or ozonator that kills microorganisms.

The pollution trap 120 contemplated herein may be configured to be disposed on any suitable vehicle surface. For example, in some embodiments the pollutant trap 120 can be permanently fixed to the vehicle 200. In other embodiments, the pollutant trap 120 can be detachably fixed to the vehicle 200. In some embodiments, the housing 224 can be permanently attached to the vehicle 200. In other embodiments, the pollutant trap pad 126 is detachable and/or replaceable. In still more embodiments, the pollutant trap 120 is exposed, while in other embodiments, the pollutant trap 120 is concealed.

Embodiments of a pollution trap and the methods of reducing pollutants on the roadway surface, as generally described herein, are not limited to four-wheeled vehicles, and are not limited to motorized vehicles. Pollution traps can be suitably designed for use on numerous types of vehicles, including two wheeled vehicles (e.g., motorcycles, bicycles, scooters, mopeds, Human Segway Transporters), three wheeled vehicles (e.g., motorized tricycles and ATV's, and non-motorized tricycles), four wheeled vehicles (e.g., ATV's, tractors, cars, trucks, vans, etc.), and other larger vehicles with more than four wheels (e.g., multi-wheeled trucks, etc.). A vehicle can be configured to include one or more pollution traps. The pollution traps can be disposed anywhere on the vehicles where the pollutant trap pad 126 can be exposed to roadway pollutants. For example, the pollution trap can be positioned in numerous places on a vehicle including, but is not limited to, fenders, front spoilers, rear spoilers, splash guards, mud flaps, wheel wells, the underside of the vehicle, or any other suitable location on the vehicle where the pollutant trap can be exposed to roadway pollutants. Additionally, pollutant traps can be placed in on any type of vehicle in locations where the pollutant trap pad 126 is not normally exposed to roadway pollutants but becomes exposed to the roadway pollutants through the use of a fan or a blower, a vacuum, or any air flow through and around the vehicle, designed or naturally occurring, or any type of device that carries the roadway pollutants to the pollutant trap pad 126.

A pollutant trap can be designed in numerous ways. In one embodiment, the pollutant trap 120 can include a single pollutant trap pad 126. In another other embodiment (not shown), the pollutant trap 120 can include multiple pollutant trap pads disposed on a roll, where one pollutant trap pad is exposed to the roadway and, after a period of time, the exposed pollutant trap pad is removed from the roll thereby exposing another pollutant trap pad which can be used to collect roadway pollutants.

In another embodiment (not shown), the pollution trap 120 can include multiple pollutant trap pads generally configured in a stack, similar to, for example, a tissue box or a napkin dispenser, with one pollutant trap pad 126 exposed to the roadway pollutants. After a period of time, the exposed pollutant trap pad 126 is removed from the pollutant trap 120 thereby exposing to the environment another pollutant trap pad 126, which is then used to collect roadway pollutants.

In another embodiment, the pollutant trap 120 can comprise materials that are generally used in paint booths for filtering particles from air. These materials can include, e.g., polyester, fiberglass, polyester and fiberglass, scrim backed materials, paper, or paper used in conjunction with fiberglass or polyester. In some embodiments, the material is tackified for high particle retention, where in other embodiments the material is non-tackified. Suitable paint booth filter materials can be obtained from several companies including, for example, Airguard of Louisville, Ky.

In yet another embodiment, the pollution trap 120 can include an indicator that shows when the pollutant trap 120 or the pollutant trap pad 126 should be serviced, for example, when the pollution trap 120 should be changed or when the pollutant trap pad 126 should be changed. In embodiments that use multiple pollutant trap pads 126, (e.g., a roll of pollutant trap pads 126 or a stack of pollutant trap pads 126), the pollutant trap 120 can include an indicator that shows when to remove the exposed pollutant trap pad 126 so that another pollutant trap pad 126 can be exposed to the environment. The aforementioned indicator can be incorporated in various ways. For example, in one embodiment the indicator is disposed on the pollutant trap frame. In another embodiment, the indicator is a chemical on the pollutant trap pad that visibly changes color to indicate when the pollutant trap pad 126 should be changed. In another embodiment, the indicator is a sensor or a sensing system that can be separate from the pollutant trap 126 or the pollutant trap and provides a signal that indicates when the pollutant trap 120 or the pollutant trap pad 126 should be serviced or changed. While the numerous materials disclosed herein are examples of suitable materials that can be used in a pollutant trap, the invention is not limited to said disclosed materials.

The following examples describes experiments conducted using prototype pollutant trap 120 to verify that the prototype pollutant trap reduced the amount of hydrocarbons on the roadway surface.

EXAMPLE 2

A pollutant trap 120 was affixed to the wheel well of a truck, and the vehicle was driven in Hawaii under wet roadway conditions. After driving about 150 miles, the pollution trap 120 was removed and analyzed for the presence of hydrocarbons. The Food Quality Lab of Honolulu, Hawaii was employed to independently analyze the amount of petroleum hydrocarbons that had accumulated on the pollution trap.

The data showed that a significant amount of petroleum hydrocarbons had accumulated on the pollution trap during the brief testing period. These results verified that the pollutant trap 120 significantly reduced the amount of roadway pollutants on a wet roadway surface. The following example describes a test that can be performed to verify that the pollutant trap 120 can remove roadway pollutants under dry road conditions, as well.

EXAMPLE 3

A pollutant trap 120 is applied to the wheel well of a truck, and driven in Hawaii under dry roadway conditions. After driving about 150 miles, the pollution trap 120 is removed and analyzed for the presence of hydrocarbons. The Food Quality Lab of Honolulu, Hawaii can be employed to analyze the accumulation of roadway pollutants on the pollution trap. It will be determined that the pollution trap also significantly reduces the amount of roadway pollutants on dry roadway surfaces. The following example describes another test that verified that the pollutant trap 120 effectively removes roadway pollutants.

EXAMPLE 4

A pollutant trap 120 was affixed to the wheel well of a 2002 Chevrolet Avalanche and the vehicle was driven around the urban areas of Honolulu, Hawaii under mixed road conditions (i.e., both wet and dry conditions). After driving about 1500 miles, the pollution trap 120 was removed and was analyzed for the presence of hydrocarbons and heavy metals. An independent laboratory, Advanced Analytical Lab, LLC of Honolulu, Hi. was employed to analyze the accumulation of roadway pollutants on the pollutant trap 120.

The results showed that a significant amount of total petroleum hydrocarbons had accumulated on the pollutant trap 120 during the brief testing period. Additionally, the results showed that a significant amount of heavy metals including barium, chromium, copper, lead, and selenium were also collected onto the pollutant trap 120. These results verified that a system comprising a vehicle and a pollutant trap 120, as described herein, effectively removes hydrocarbons and heavy metals from a roadway surface. The next example provides more proof that embodiments of the invention described herein effectively remove pollutants from the environment.

EXAMPLE 5

Different pollutant traps 120 were affixed to the wheel wells of a Nissan Frontier/King cab pick-up truck that was driven around the urban areas of Las Vegas, Nev. under mixed road conditions (i.e., wet or dry conditions). After driving approximately 402 miles, 681 miles, 1415 miles, or 3278 miles, the pollutant traps 120 were removed and were analyzed for the presence of hydrocarbons, heavy metals, and various chemicals. An independent laboratory, NEL Laboratories of Las Vegas, Nev. was employed to analyze the accumulation of roadway pollutants on the pollutant traps 120.

In a first set of experiments, the same type of pollutant trap 120 was tested under dry and wet road conditions. The results showed that a significant amount of total petroleum hydrocarbons (TPH) had accumulated on the pollutant trap 120 in both wet and dry conditions. For example, a 2.5 inch×2.5 inch square cut from the filter accumulated approx. 6.5 mg total TPH under dry conditions (approx. 0.04 fl. oz of total TPH/sq. inch) and 17.2 mg TPH (approx. 0.11 fl. oz of total TPH/sq. inch) under wet conditions. Appreciable amounts of heavy metals including barium, cadmium, chromium, and lead were also collected onto the pollutant traps 120 and volatile chemicals such as dibromofluoromethane, toluene, and 4-bromofluorobenzene had also accumulated on the pollutant traps 120. These experiments verified that the pollutant trap 120 effectively removed hydrocarbons, heavy metals, and volatile chemicals from the environment under wet or dry road conditions.

In a second set of experiments, the ability of different pollutant traps to accumulate hydrocarbons, heavy metals, and chemicals were compared under dry road conditions. Both types of pollutant traps 120 were found to be effective at removing total hydrocarbons, heavy metals, and chemicals from the environment. In fact, the amount of hydrocarbons accumulated on one type of pollutant trap 120 was more than 4 times the amount of hydrocarbons than was found present on the control (unexposed) section of pollutant trap 120. The results showed that barium, cadmium, chromium, copper, lead, silver, mercury (on one type of filter), 4-bromofluorobenzene, dibromofluoromethane, and toluene had accumulated. These results provide more evidence that a system comprising a vehicle and a pollutant trap 120, as described herein, effectively removes hydrocarbons, heavy metals, and chemicals from the environment. Roadway tests as provided in the examples above are to be conducted in all 50 states of the United States and various countries throughout the world, as described in the following example.

EXAMPLE 6

Pollution traps 120 are applied to the wheel wells of several vehicles, and driven in all 50 states under wet and dry conditions and in several foreign countries. After driving about 1000 miles, the pollution traps 120 are removed and analyzed for the presence of roadway pollutants by, for example, The Food Quality Lab of Honolulu, Hi. These experiments will show that the amount of roadway pollutants, such as hydrocarbons and toxic metals, can be reduced in all 50 states and in several countries throughout the world by employing the pollution trap 120 described herein.

EXAMPLE 7

A pollution trap 120 was applied to the wheel wells of a vehicle and driven in all Nevada under wet and dry conditions. After driving about 3000 miles, the pollution trap 120 was removed and analyzed for the presence of roadway pollutants by, EMSL Analytical, Inc ("EMSL") of Westmorit, N. J. EMSL used a combination of polarized light microscopy, scanning electron microscopy, transmission electron microscopy, energy dispersive X-ray spectrometry, and X-ray diffraction to analyze the particles deposited on the pollutant trap. EMSL identified the following concentration (percentages) of particles: quartz 23%, calcite 20%, dolomite 17%, other minerals 2%, calcium silicate 25%, steel fragments 2% and unidentified organics 11%. EMSL also identified the following information related to particle size distribution on the exposed pollutant trap pad:

TABLE 1

| Particle Size Distribution | | |
|---|---|---|
| Particle Size Range (μm) | Exposed Material % by Particle Area | Exposed Material % by Number of Particles |
| 0.178–0.316 | .9 | 31.8 |
| 0.316–0.562 | 3.2 | 37.5 |
| 0.562–1 | 5.2 | 18.1 |
| 1–1.78 | 6.5 | 6.9 |
| 1.78–3.16 | 9.8 | 3.4 |
| 3.16–5.62 | 13.1 | 1.4 |
| 5.62–10 | 19.3 | 0.6 |
| 10–17.8 | 16.8 | 0.2 |
| 17.8–31.6 | 25.1 | 0.1 |
| 31.6–100 | None Detected | None Detected |

Table 1 Particle Size Distribution

This experiment showed that a pollutant trap 120 can remove roadway pollutant particles of various compositions under a variety of conditions and thereby reduce the amount of roadway pollutants.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof. All of the references cited herein are expressly incorporated by reference in their entireties.

What is claimed is:

1. An apparatus on a vehicle for collecting pollutant particles liberated from a roadway, comprising:
   an element comprising a material configured to retain roadway pollutant particles, that are 10 μm or less, which are liberated from said roadway by a tire of said vehicle, wherein said element is affixed to said vehicle at a location that receives a spray of said liberated roadway pollutant particles.

2. The apparatus of claim 1, wherein said element is attached to a portion of a wheel well of the vehicle.

3. The apparatus of claim 1, wherein said material is magnetic.

4. The apparatus of claim 1, wherein said material is configured to collect pollutants that are less than about 5 microns.

5. The apparatus of claim 1, wherein said material is configured to collect pollutants that are less than about 2.5 microns.

6. The apparatus of claim 1, wherein said material is configured to collect hydrocarbons and heavy metals.

7. The apparatus of claim 1, wherein said material is configured to collect pollutants emitted from deteriorated brake pads.

8. The apparatus of claim 1, wherein said material comprises a filter.

9. The apparatus of claim 1, wherein said material comprises a pad.

10. The apparatus of claim 1, said element comprises one or more electrically charged plates.

11. The apparatus of claim 1, wherein said material comprises a binding agent that binds a pollutant particle in said spray of pollutant particles to said material when said pollutant particles contact said element.

12. The apparatus of claim 2, wherein said element is attached to a surface of said wheel well substantially between a surface of said wheel well and said rotating tire of said vehicle.

13. The apparatus of claim 1, wherein said element is attached to a mud flap of said vehicle.

14. The apparatus of claim 1, wherein said element is positioned behind a portion of the surface of a wheel well.

15. The apparatus of claim 1, wherein said element is attached to the underside of said vehicle.

16. The apparatus of claim 1, wherein said element is attached to a splash guard of said vehicle.

17. The apparatus of claim 1, further comprising a frame configured to hold said element on said vehicle.

18. The apparatus of claim 1, wherein said material is oleophilic.

19. The apparatus of claim 1, wherein said material is porous.

20. The apparatus of claim 1, wherein said material is hydrophobic.

21. A method for collecting pollutant particles liberated from a roadway surface, the method comprising:
    positioning an element to receive a spray of roadway pollutant particles that are liberated from the roadway by a tire of a vehicle, wherein said element comprises a material configured to collect said pollutant particles that are 10 µm or less;
    contacting the roadway with a tire of the vehicle;
    rotating the tire to liberate pollutant particles from the roadway;
    receiving said pollutant particles on said material; and
    collecting at least a portion of said pollutant particles on said material.

22. The method of claim 21, wherein said element is attached to a portion of a wheel well of said vehicle.

23. The method of claim 21, wherein said material is magnetic.

24. The apparatus of claim 21, wherein said material is configured to collect pollutants that are less than about 5 microns.

25. The apparatus of claim 21, wherein said material is configured to collect pollutants that are less than about 2.5 microns.

26. The apparatus of claim 21, wherein said material is configured to collect pollutants comprising heavy metals.

27. The apparatus of claim 21, wherein said material is configured to collect pollutants comprising hydrocarbons.

28. The apparatus of claim 21, wherein said material comprises a filter.

29. The apparatus of claim 21, wherein said material comprises a pad.

30. The apparatus of claim 21, wherein said material comprises binding agents that bind a pollutant particle in said spray of pollutant particles to said material when said pollutant particles contact said material.

31. The apparatus of claim 21, wherein said element is attached to a surface of said wheel well substantially between a surface of said wheel well and said rotating tire of said vehicle.

32. The apparatus of claim 21, wherein said element is attached to a mud flap of said vehicle.

33. The apparatus of claim 21, wherein said element is positioned behind a portion of the surface of a wheel well.

34. The apparatus of claim 21, wherein said element is attached to the underside of said vehicle.

35. The apparatus of claim 21, wherein said element is attached to a splash guard of said vehicle.

36. A system for collecting pollutant particles liberated from a roadway, comprising:
    a vehicle comprising at least one tire; and
    an element comprising a material configured to retain roadway pollutant particles, that are 10 µm or less, which are liberated from said roadway by said tire of said vehicle wherein said element is affixed to said vehicle at a location that receives a spray of said liberated roadway pollutant particles.

37. The system of claim 36, wherein said vehicle comprises a wheel well and said element is affixed to a portion of said wheel well.

38. The system of claim 37, wherein said vehicle comprises an inlet on said wheel well, said inlet configured to allow the spray of said pollutant particles to flow through said inlet, arid wherein said element is affixed to a location to receive said pollutant particles that flow through said inlet.

* * * * *